(12) United States Patent
Ostini et al.

(10) Patent No.: US 10,137,868 B2
(45) Date of Patent: Nov. 27, 2018

(54) BRAKING DEVICE FOR VEHICLES SUCH AS, FOR EXAMPLE, WALKING FRAMES, STROLLERS OR DISABLED WHEELCHAIRS

(71) Applicants: Luca Ostini, Gravesano (CH); Eric Robert Warsitz, Carabbia (CH)

(72) Inventors: Luca Ostini, Gravesano (CH); Eric Robert Warsitz, Carabbia (CH)

(*) Notice: Subject to any disclaimer, the term of this patent is extended or adjusted under 35 U.S.C. 154(b) by 65 days.

(21) Appl. No.: 15/512,293

(22) PCT Filed: Sep. 1, 2015

(86) PCT No.: PCT/IB2015/056627
§ 371 (c)(1),
(2) Date: Mar. 17, 2017

(87) PCT Pub. No.: WO2016/042431
PCT Pub. Date: Mar. 24, 2016

(65) Prior Publication Data
US 2018/0229697 A1     Aug. 16, 2018

(30) Foreign Application Priority Data
Sep. 18, 2014 (IT) .............................. RM2014A0529

(51) Int. Cl.
*B62L 3/02* (2006.01)
*B60T 7/10* (2006.01)
(Continued)

(52) U.S. Cl.
CPC .............. *B60T 7/108* (2013.01); *A61G 5/101* (2013.01); *A61H 3/04* (2013.01); *B60T 11/046* (2013.01);
(Continued)

(58) Field of Classification Search
CPC ..... B62L 3/026; A61H 3/04; A61H 2003/046; B62B 23/04; B62K 21/26; B60T 7/10
See application file for complete search history.

(56) References Cited

U.S. PATENT DOCUMENTS 4,653,613 A * 3/1987 Blancas .................... B62L 1/16
188/2 D
5,667,236 A * 9/1997 Murphy ............... A61G 5/1018
188/2 F
(Continued)

FOREIGN PATENT DOCUMENTS

CH          201 811 A     12/1938
DE      299 07 287 U1      7/1999
(Continued)

OTHER PUBLICATIONS

International Search Report, dated Mar. 21, 2016, from corresponding PCT application.

*Primary Examiner* — Luis A Gonzalez
(74) *Attorney, Agent, or Firm* — Young & Thompson

(57) ABSTRACT

A braking device for a vehicle such as, for example, a walking frame, a stroller or a disabled wheelchair, includes: a hand grip extending along an extension axis X-X adapted to be rotatably mounted on a handlebar of a vehicle; a slide operatively connected to the cable of a vehicle brake; the slide being translatable between a locked position tensioning the cable of a brake and an unlocked position leaving loose the cable of a brake, and vice versa; and at least one pin element integral with the hand grip and engaged with a profile of the slide; the pin element sliding with respect to the profile between a first position, in which the slide is in the unlocked position, and a second position, in which the slide is in the locked position, and vice versa.

20 Claims, 6 Drawing Sheets

(51) Int. Cl.
  *B60T 11/04* (2006.01)
  *B62B 9/08* (2006.01)
  *A61H 3/04* (2006.01)
  *A61G 5/10* (2006.01)

(52) U.S. Cl.
  CPC .............. *B62B 9/085* (2013.01); *B62B 9/087* (2013.01); *A61G 5/1037* (2013.01); *A61H 2003/046* (2013.01); *B62L 3/026* (2013.01)

(56) References Cited

U.S. PATENT DOCUMENTS

| | | | |
|---|---|---|---|
| 5,802,927 A | | 9/1998 | Yu et al. |
| 6,041,895 A | * | 3/2000 | Mao .................. B62K 23/04 188/24.22 |
| 7,100,931 B2 | * | 9/2006 | Gu .................... B62K 23/04 280/288.4 |
| 2005/0285369 A1 | | 12/2005 | Jiun |

FOREIGN PATENT DOCUMENTS

| | | |
|---|---|---|
| FR | 924 208 A | 7/1947 |
| GB | 806 651 A | 12/1958 |

\* cited by examiner

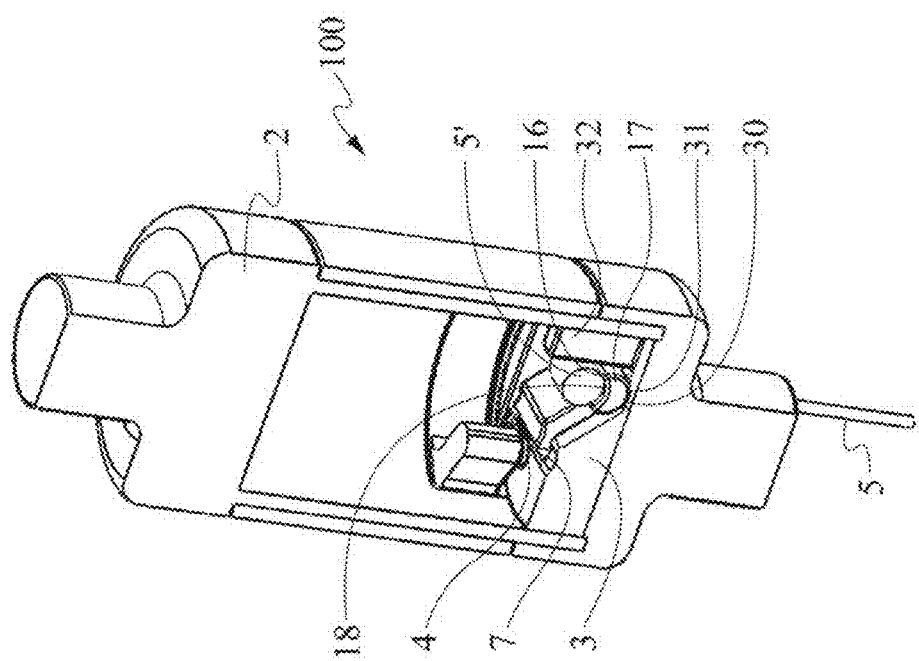
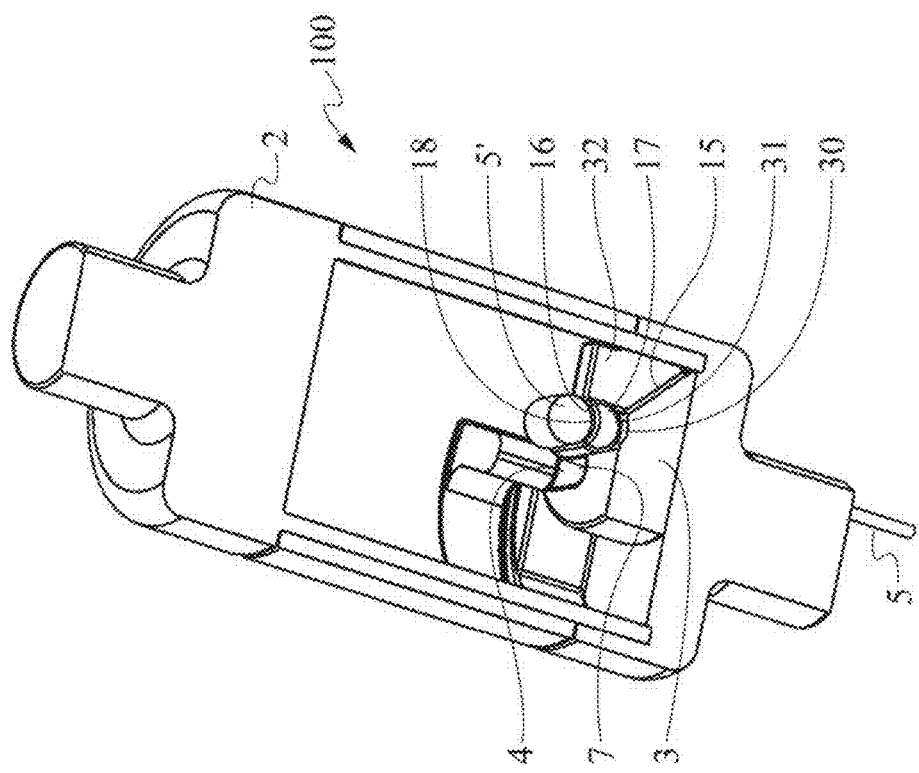

BRAKING DEVICE FOR VEHICLES SUCH AS, FOR EXAMPLE, WALKING FRAMES, STROLLERS OR DISABLED WHEELCHAIRS

DESCRIPTION OF THE INVENTION

Field of the Invention

The present invention concerns a braking device for vehicles such as, for example, a walking frame, a stroller or a disabled wheelchair, the present invention further concerns a walking frame provided with the afore said braking device.

Known Art

Generally, vehicles of the above mentioned type have a braking system operating on a wheel by tensioning the afore said brake cable through a lever of the brake.

The brake cable is connected, on one side, to the actual brake and usually to the lever placed on the handlebar, at the remaining end.

The Applicant noticed that a big problem in the field is the need of taking away the hand, on some fingers thereof, from the handlebar in order to activate the brake lever.

Such a movement that appears banal for most people, it is not, especially for those people using walking frames to walk safely and to which even the simple removal of the hand, or any part thereof, from the handlebars requires a big effort and is a stress cause.

The Applicant has also noted that the aforesaid operation involves a delay in braking, due to the time required to remove fingers from the hand grip and lay them on the brake lever, what to avoid in the event of emergency, especially with strollers or disabled wheelchairs.

Therefore, the Applicant found the need to provide a new braking device of simple construction, which at the same time is easy and intuitive to use and that does not involve the lifting of the fingers from the handlebar and, consequently, does not entail efforts and is not a source of stress.

The Applicant also found the need to provide a new braking device which is compact and does not require excessive bulk for its installation.

The Applicant also found the need to provide a new braking device for vehicles such as for example a walking frame, a stroller or a disabled wheelchair, that allows braking gradually and has a position to lock the brake in a safe manner, once a predetermined level of braking has been reached.

SUMMARY OF THE INVENTION

Therefore, in its first aspect the invention concerns a braking device for a vehicle such as a walking frame, a stroller or a disabled wheelchair, comprising:
- a hand grip extending along an extension axis adapted to be rotatably mounted on a handlebar of a vehicle;
- a slide operatively connected to a cable of a vehicle brake or lock;
- said slide being translatable between a locked position tensioning said cable of a brake and an unlocked position leaving loose the cable of a brake, and vice versa;
- said slide being translatable orthogonally to the extension axis;
- at least one pin element integral with said hand grip and engaged with a profile of said slide; the pin element sliding with respect to said profile to activate the translation of said slide; said pin element sliding with respect to said profile between a first position, in which said slide is in the unlocked position, and a second position, in which said slide is in the locked position, and vice versa;
- the pin element or the profile being integral with the hand grip so that the rotation of the hand grip activates the translation of the slide.

Moreover, in the scope of the present invention, with the expression "loose" is meant a state of tension of the brake cable that does not operate the brake itself.

The present invention, in the afore said aspect, may have at least one of the favorite features described hereinbelow.

Preferably, said at least one pin element is integral with the hand grip and the profile is made on the slide.

Advantageously, the pin element is rotatable integrally with the hand grip along an arc of a circle.

Preferably, the slide is concentrically mounted outside of said handlebar.

Preferably, the profile is shaped so that to comprise:
- a start point of the travel of the pin element,
- a limit point of the travel of the pin element; and
- a maximum point corresponding to the maximum distance of the slide from the extension axis X-X, said maximum point being in a position in-between said start point and said limit point of the travel.

In this way, as long as the pin element does not reach the maximum point, if the user releases the hand grip, the pin element will return back to the start position of the travel, such a situation corresponding to a progressive activation of the brake on the wheel up to the maximum point and to its subsequent gradual release.

Conversely, once the pin element has crossed the maximum point in the direction of the limit point of the travel, the pin element will not be able to go back and the brake will be in the position locking the wheel. The pin element will not be able to go back even if the hand grip will be released by the user.

To return the hand grip from the maximum point to the start position of the travel, a voluntary action of the user is needed to rotate the hand grip so that the pin element crosses the maximum point in the direction of the start point of the travel.

Advantageously, the pin element has a shape converging at its engagement portion that engages said profile.

Preferably, the engagement portion is curvilinear.

Advantageously, the device comprises at least one first shell-shaped element combinable with the hand grip to contain at least partially the slide.

Conveniently, the slide comprises a seat for accommodating an end of the brake cable.

Preferably, the seat is arranged so that the translation direction of said slide is parallel to the tensioning direction of the end of said cable coupled with said slide.

According to another embodiment, the slide comprises an inclined plane and the cable comprises, at one end, a cable head adapted to slide on the inclined plane between a first position, in which the slide is in the locked position, and a second position, in which the slide is in the unlocked position, and vice versa.

Preferably, the slide comprises a limit element for the cable head at the locked position of the slide.

Advantageously, the limit element of the cable head comprises a groove adapted to house at least partially the cable head.

Conveniently, the cable head comprises a curved surface to allow an easier sliding of the cable head on the inclined plane.

Preferably, the cable head is arranged with respect to the slide so that the translation direction of the slide is orthogonal to the tensioning direction of the cable end on which the cable head is placed.

According to another aspect, the present invention concerns a walking frame of the type comprising at least one frame, at least three wheels and at least one handlebar characterized by comprising at least one braking device as described above.

According to another aspect, the present invention concerns a stroller or a disabled wheelchair of the type comprising at least one frame, at least three wheels and at least one handlebar characterized by comprising at least one braking device as described above.

BRIEF DESCRIPTION OF THE DRAWINGS

Further characteristics and advantages of the invention will be more evident from the detailed description of some preferred embodiments, but not exclusive, of a new braking device according to the present invention.

Such a description will be hereinafter explained referring to the attached drawings, provided for purposes of illustrations only, and thereby not limitative, wherein:

FIGS. 5a, 5b are two perspective and sectional views of a second embodiment of the braking device according to the present invention, respectively with the slide in the locked position and with the slide in the unlocked position;

DETAILED DESCRIPTION OF EMBODIMENTS OF THE INVENTION

Referring to FIGS. 1-3b, a braking device according to the present invention is denoted with the numeral reference 100.

In detail, the braking device 100 comprises:
a hand grip 2 extending along an extension axis X-X adapted to be rotatably mounted on a handlebar of a vehicle;
a slide operatively connected to a cable 5 of a vehicle brake. The cable 5 and the brake (not shown in the figures) can be of any known type and, for this reason, they will not be further described.

An example of a brake adapted to the purpose and consisting of the brakes for road bicycle, so-called because used on road cycling, are characterized by two levers of the class one, which are fixed on a single common pin.

This type of brake requires only one single spring, which is rooted in its half to the pin of the levers, thus allowing to always have a perfect action on both levers, furthermore the control is achieved with the simple brake cable, without the use of a second cable and a splitting plate.

With this type of brake it is easy to adjust the correct simultaneous contact of brake pads, as well as their position on the rim and their inclination, as the pads slide on a guide, moreover they do not require the toe-in adjustment, due to the features of the brake itself.

Figure 1:
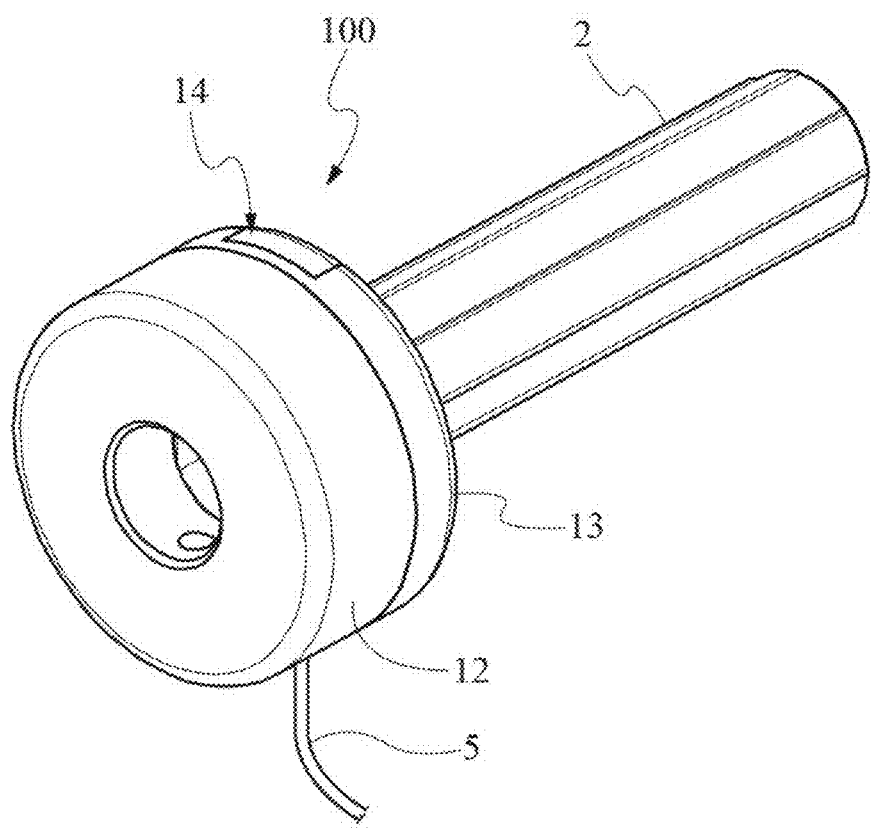
FIG. 1 is a schematic perspective view of a first embodiment of a braking device according to the present invention.
Figure 2:
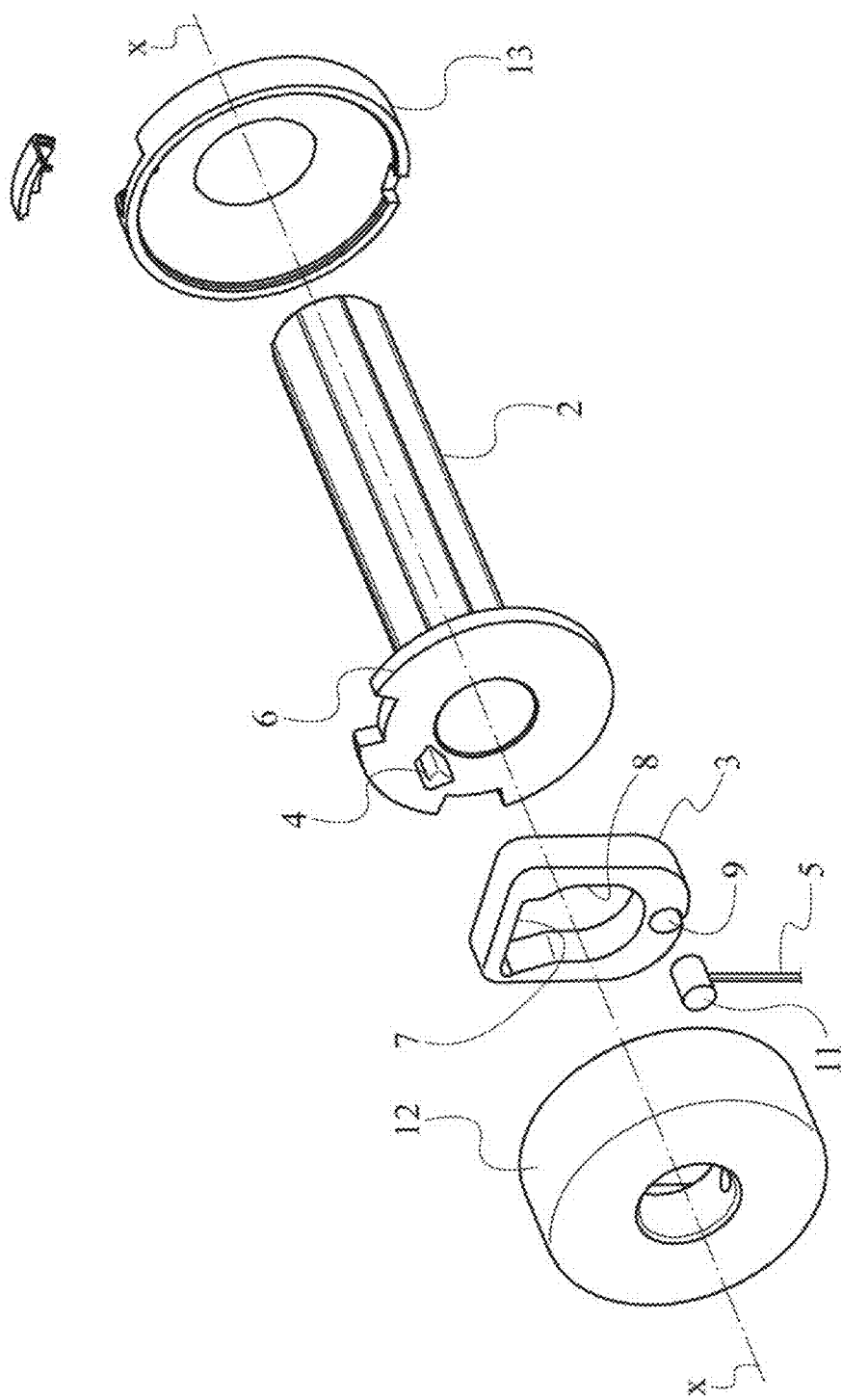
FIG. 2 is a schematic exploded view of the braking device shown in FIG. 1.
Figure 3A:
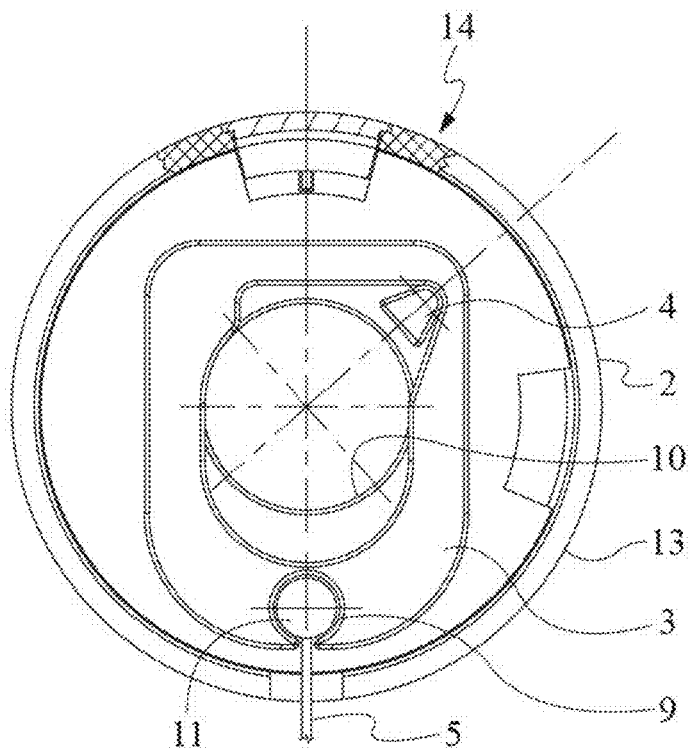
FIGS. 3a, 3b are two sectional views of the braking device in FIG. 1, respectively with the slide in the unlocked position and with the slide in the locked position.
Figure 3B:
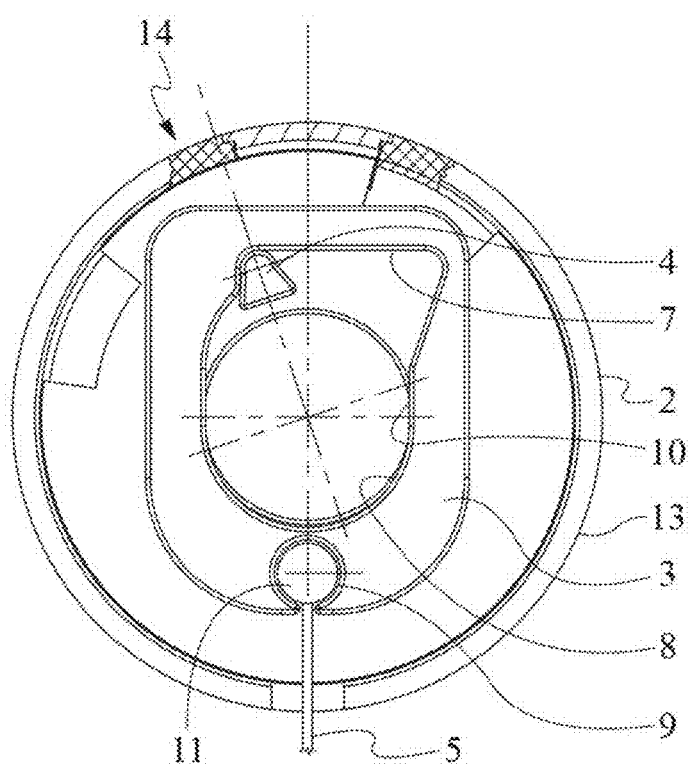

The slide 3 is translatable between a locked position shown in FIG. 3b, in which the cable 5 of a brake is tensioned and has activated the brake itself on the wheel and an unlocked position shown in FIG. 3a, which leaves loose the cable 5 of a brake and, consequently, does not activate the brake, thereby allowing the wheel to rotate freely.

The slide 3 is translatable substantially perpendicularly to the axis of extension X-X, this allows having compact size of the device in the extension direction, to the advantage of a reduction of the overall bulk and the ease of installation on any type of vehicle.

The hand grip 2 is hollow and has, at its end, a flanged portion 6.

The flanged portion 6 has a pin element 4 integral with said hand grip 2.

The pin element 4 is arranged on the flanged portion 6 radially with respect to the extension axis X-X and projects in the direction of the axis X-X in the opposite way with respect to the hand grip 2.

The pin element 4 is integral with the hand grip 2 and, when the braking device is assembled, is engaged with a profile of the slide 3. The pin element 4 is slidable with respect to the profile 7 to activate the translation of the slide 3.

The pin element 4 slides with respect to the profile 7 between a first position, in which the slide 3 is in the unlocked position shown in FIG. 3a, and a second position in which the slide is in the locked position, shown in FIG. 3b.

The slide 3, when the braking device 100 is assembled, as shown in FIGS. 3a, 3b, is concentrically mounted outside of the handlebar 10. For this purpose, in the embodiment shown in FIGS. 1-3b, the slide 3 has a central shaped seat 8 penetrated by the handlebar 10.

The profile 7 is shaped so that to comprise:
a start point of the travel of the pin element 4,
a limit point of the travel of the pin element 4; and
a maximum point corresponding to the maximum distance of the slide 3 from the extension axis X-X.

The maximum point is located in a position in-between the start point and the limit point of the travel.

In the embodiment shown in the figures, the start point of the travel is such that when the pin element is at the start point of travel, the slide 3 is in the unlocked position shown in FIG. 3a.

On the contrary, the limit point of the travel is such that when the pin element 4 is at the limit point of travel, the slide 3 is in the locked position shown in FIG. 3b.

In this way, as long as the pin element does not reach the maximum point, if the user releases the hand grip, the pin element will return back to the start position of the travel, such a situation corresponding to a progressive activation of the brake on the wheel up to the maximum point and to its subsequent gradual release.

Conversely, once the pin element has crossed the maximum point in the direction of the limit point of the travel, the pin element will not be able to go back and the brake will be in the position locking the wheel. The pin element will not be able to go back even if the hand grip will be released by the user.

To return the hand grip from the maximum point to the start position of the travel, a voluntary action of the user is needed to rotate the hand grip so that the pin element crosses the maximum point in the direction of the start point of the travel.

In the embodiment shown in FIGS. 1-3b, the profile 7 is made as a portion of an inner surface of the seat 8, but it may be differently realized on the slide 3 without departing from the protection scope of the present invention.

In a not shown embodiment, the profile 7 is made on the hand grip or on a distinct element integral with the hand grip and the pin element is integral with the slide 3.

In the embodiment shown in FIGS. 1-3b, the pin element 4 has a shape converging at its engagement portion that engages said profile 7. In detail, still referring to the embodiment shown in the figure, the pin element has a substantially triangular section with its engagement portion substantially curved or rounded, represented by an upper vertex of the triangle.

The shape of the pin element 4 and the profile 7 is such that by releasing the hand grip 2, in the first run length of the profile the pin element 4 goes back to the start position of the travel and, consequently, the slide translates vertically downwards, thereby releasing the tension of the cable 5 of the brake; on the other hand, once the maximum point has been passed, the shape of the pin element 4 and the profile 7 is such that the pin element 4 tends to go to the limit position of the travel and not to go back.

In the limit position of the travel the pin element is such that the pin element tends to stay in said position.

In order to engage the cable 5 of the brake with the slide 3 and, consequently, to allow the tensioning thereof as a function of the translation of the slide 3, the latter also has, in its lower portion, a seat 9 for housing the head of a cable 5 of the brake.

The seat 9 is a cylindrical seat sized to house the annulus generally placed on the end of a cable 5 of the brake. The seat 9 is arranged so that the translation direction of said slide 3 is parallel to the tensioning direction of the end of the cable 5 coupled with the slide 3.

In general, according to this embodiment of the invention, the cable 5 is coupled to the slider 3 so that the direction of translation of the slide 3 is orthogonal to the tensioning direction of the end of the cable 5 engaged with the slide.

Still referring to the embodiment shown in FIGS. 1-3b, the braking device 100 can have at least one first shell-shaped element 12 combinable with the hand grip 2 to at least partially contain the slide 3.

The first shell-shaped element 12 is substantially cylindrical with a circular central seat adapted to be penetrated by the handlebar 10.

The first shell-shaped element 12 couples with a second shell-shaped element 13 also provided with a circumferential central seat for the hand grip 2 of the handlebar 10.

The first 12 and second 13 shell-shaped elements, by coupling one another, house the flanged portion 6 with the respective pin element 4 and the slide 3 with a portion of the cable 5.

There may be an indicator 14 of the relative position for locking/unlocking the brake.

Figure 6:
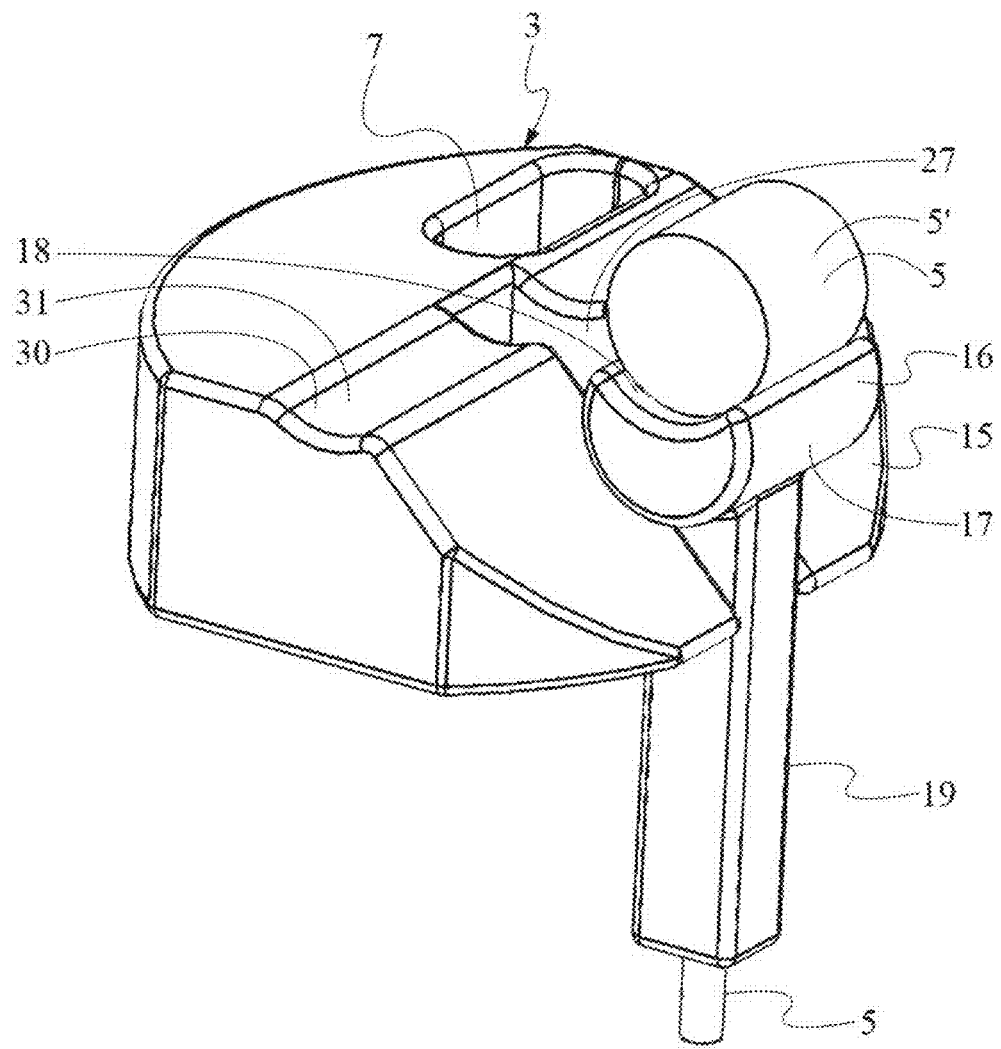
FIG. 6 is an enlarged view of a detail of the braking device of FIGS. 5a-5b.

In FIGS. 5a-6 a schematic view of an alternative embodiment of a braking device according to the present invention is shown. In detail, even according to this embodiment, the braking device 100 comprises a hand grip 2 extending along an extension axis X-X adapted to be rotatably mounted on a handlebar of a vehicle, and a slide 3 operatively connected to a cable 5, such as a cable of a vehicle brake.

The slide 3 is translatable between a locked position shown in FIG. 5a, in which the cable 5 is tensioned, and an unlocked position shown in FIG. 5b, which leaves loose the cable 5.

Such a device can be used not only as a braking device, but also to activate or deactivate a device through the different tensioning of a cable.

The slide 3 is translatable substantially perpendicularly to the axis of extension X-X, this allows having compact size of the device in the extension direction, to the advantage of a reduction of the overall bulk and the ease of installation on any type of vehicle.

The hand grip 2 is hollow and has a pin element 4 integral with said hand grip 2.

The pin element 4 is integral with the hand grip 2 and, when the braking device is assembled, is engaged with a profile 7 of the slide 3. The pin element 4 is slidable with respect to the profile 7 to activate the translation of the slide 3.

The pin element 4 slides with respect to the profile 7 between a first position, in which the slide 3 is in the unlocked position shown in FIG. 5a, and a second position in which the slide 3 is in the locked position, shown in FIG. 5b.

According to this embodiment, the slide 3 comprises an inclined plane 15 and, at one end 5', the cable 5 comprises a cable head 16, i.e. an engagement element for the end 5' of the cable 5.

The cable head 16 is shaped and sized to slide with respect to the inclined plane 15 between a first position, as shown in FIG. 5a, in which the slide is in the locked position, and a second position in which the slide is in the unlocked position (FIG. 5b) and vice versa.

The profile 7 is shaped so that to comprise:
a start point of the travel of the pin element 4; and
a limit point of the travel of the pin element 4.

In the embodiment shown in the FIGS. 5a-6, the start point of the travel is such that when the pin element 4 is at the start point of travel, the slide 3 is in the unlocked position shown in FIG. 5b, and the cable head 16 is in the corresponding lower edge of the inclined plane 15.

On the contrary, the limit point of the travel is such that when the pin element 4 is at the limit point of travel, the slide 3 is in the locked position shown in FIG. 5a, and the cable head 16 is in the corresponding upper edge of the inclined plane 15.

In this way, as long as the pin element 4 does not reach the limit point of the travel, if the user releases the hand grip, the pin element 4 will return back to the start position of the travel, such a situation corresponding to a progressive activation of the brake up to the limit point of the travel and to its subsequent gradual release.

Conversely, once the pin element 4 has reached the limit point of the travel, the pin element 4 will not be able to go back and the brake will be in the locked position on the wheel. The pin element will not be able to go back even if the hand grip will be released by the user.

To return the hand grip 2 from limit point of the travel to the start position of the travel, a voluntary action of the user is needed to rotate the hand grip 2 in the way opposite to the previous activation, that is to say that one to bring it to the locked position.

The cable head 16 is coupled to the slide 3 so that the translation direction of the slide 3 is orthogonal to the tensioning direction of the end 5' of the cable 5 on which the cable head 16 is placed.

For this purpose, the cable head 16 has a substantially cylindrical first portion 17 comprising a curved surface 18 adapted to slide on the inclined plane 15, and a second portion 19 orthogonal to the first portion 17 and at least partially containing the cable 5.

The second portion 19 slides in a through slot 27 obtained on the slide 3 and open at one end of the slide 3.

The slot 27 has such a width to allow the passage of the second portion 19 of the cable head 16 and/or the cable 5.

In the embodiment shown in the figures, the slot 27 is arranged according to the translation direction of the slide 3 and extends, in this direction, at least for the whole extent of the inclined plane 15.

Preferably, the slot 27 extends in the translation direction of the slide 3, beyond the extent of the inclined plane 15.

Advantageously, the slide 3 comprises a limit element 30 for the cable head 16 at the locked position of the slide 3.

In the embodiment shown in FIGS. 5a-6, the limit element 30 of the cable head 16 comprises a groove 31 adapted to house at least partially the cable head 16, in detail adapted to house at least partially the first portion 17 of the cable head 16.

In the embodiment shown in FIGS. 5a-6, the groove 31 has a sectional shape substantially corresponding to that of the curved surface 18 so as to accommodate it.

The groove 31 is located adjacent to the upper edge of the inclined plane 15.

To allow the cable head 16 to slide with respect to the inclined plane 15, there is a countercheck element 32 on which the cable head 6 rests during the translation of the slide 3.

The translation of the slide 3 entails the sliding of the cable head 16 with respect to the inclined plane 15.

Still referring to the embodiment shown in FIGS. 5a-6, the braking device 100 can have at least one first shell-shaped element 12 combinable with the hand grip 2 to at least partially contain the slide 3.

The first shell-shaped element 12 is substantially cylindrical with a central seat adapted to contain the slide 3.

The first shell-shaped element 12 comprises the countercheck element 32.

Figure 4:
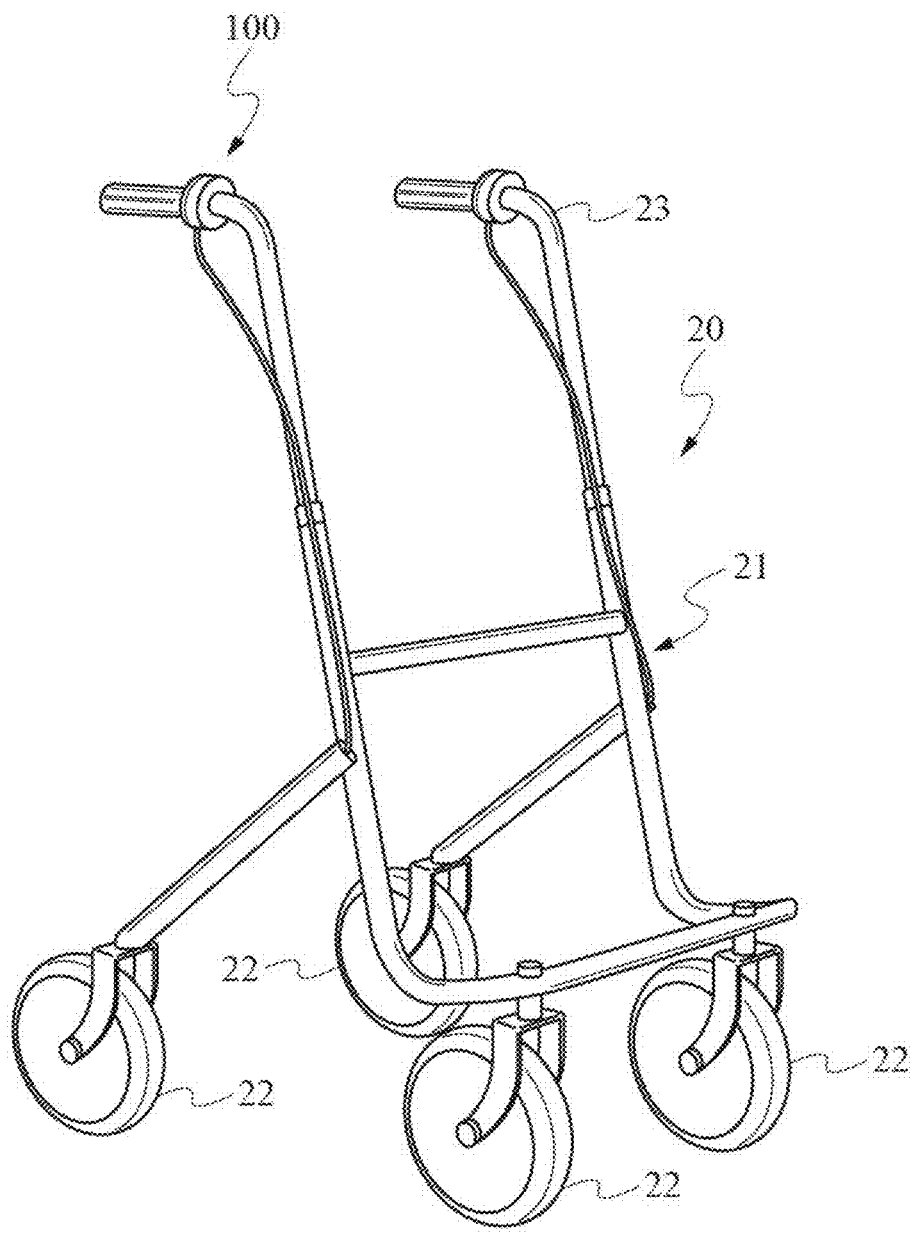
FIG. 4 is a schematic perspective view of a walking frame carrying a braking device according to the present invention.

In FIG. 4 a walking frame for elderly people is shown, or people who have problems walking in an autonomous manner or which, simply to walk, want to rest on something to feel more confident.

Known walking frames 20 generally have a frame 21 that supports a certain number of wheels 22, usually four, and realizes or is integral with a handlebar 23.

An end of the handlebar 23, or both, as in the case shown in FIG. 4, has a braking device 100 according to the present invention.

The present invention has been described referring to some embodiments. To the embodiments herein represented in detail various modifications can be made, anyway remaining in the protection scope of the invention, defined by the following claims.

The invention claimed is:

1. Braking device (100) for a vehicle such as, for example, a walking frame, a stroller or a disabled wheelchair, comprising:
  a hand grip (2) extending along an extension axis (X-X) adapted to be rotatably mounted on a handlebar of a vehicle;
  a slide (3) operatively combined with a cable of a vehicle brake or lock;
  said slide (3) being translatable between a locked position tensioning said cable and an unlocked position leaving loose the cable, and vice versa;
  said slide (3) being translatable orthogonally to the extension axis (X-X) of said hand grip;
  at least one pin element (4) engaged with a profile; said at least one pin element (4) sliding with respect to said profile to activate the translation of said slide; said at least one pin element (4) sliding with respect to said profile between a first position, in which said slide is in the unlocked position, and a second position, in which said slide is in the locked position, and vice versa;
  said at least one pin element (4) or said profile (7) being integral with said hand grip so that the rotation of the hand grip activates the translation of said slide (3).

2. Braking device (100) according to claim 1, wherein said at least one pin element (4) is integral with said hand grip and said profile (7) is made on said slide (3).

3. Braking device (100) according to claim 1, wherein said at least one pin element (4) can rotate integrally with said hand grip (2) along an arc of a circle.

4. Braking device (100) according to claim 1, wherein said slide (3) is concentrically mounted outside of said handlebar.

5. Braking device (100) according to claim 1, wherein said profile is shaped so that to comprise:
  a start point of the travel of the pin element (4),
  a limit point of the travel of the pin element (4); and
  a maximum point corresponding to the maximum distance of the slide from the extension axis X-X, said maximum point being in a position in-between said start point and said limit point of the travel.

6. Braking device (100) according to claim 1, wherein said at least one pin element (4) has a shape converging at its engagement portion that engages said profile.

7. Braking device (100) according to claim 1, wherein said engagement portion is curvilinear.

8. Braking device (100) according to claim 1, further comprising at least one first shell-shaped element combinable with said hand grip (2) to at least partially contain said slide (3).

9. Braking device (100) according to claim 1, wherein said slide (3) comprises a seat (9) for accommodating an end of said cable (5).

10. Braking device (100) according to claim 9, wherein said seat (9) is arranged so that a translation direction of said slide is parallel to the tensioning direction of the end of said cable (5) coupled with said slide (3).

11. Braking device (100) according to claim 1, wherein said slide (3) comprises an inclined plane (15) and said cable (5) comprises, at one end (5'), a cable head (16) adapted to slide with respect to said inclined plane (15) between a first position, in which said slide (3) is in the locked position, and a second position, in which said slide is in the unlocked position, and vice versa.

12. Braking device (100) according to claim 11, wherein said slide (3) comprises a limit element (30) for said cable head (16) at the locked position of said slide (3).

13. Braking device (100) according to claim 12, wherein said limit element (30) of the cable head (16) comprises a groove (31) adapted to house at least partially said cable head (16).

14. Braking device (100) according to claim 11, wherein said cable head (16) comprises at least one curved surface (18).

15. Braking device (100) according to claim 11, wherein said cable head (16) is coupled to said slide (3) so that the translation direction of said slide (3) is orthogonal to the tensioning direction of the end of said cable (5) on which said cable head (16) is placed.

16. Walking frame (20) of a type comprising at least one frame (21), at least three wheels (22) and at least one handlebar (23), further comprising at least one braking device according to claim 1.

17. Baby stroller of a type comprising at least one frame, at least three wheels and at least one handlebar, further comprising at least one braking device according to claim 1.

18. Braking device (100) according to claim 2, wherein said slide (3) is concentrically mounted outside of said handlebar.

19. Braking device (100) according to claim 3, wherein said slide (3) is concentrically mounted outside of said handlebar.

20. Braking device (100) according to claim 2, wherein said profile is shaped so that to comprise:
    a start point of the travel of the pin element (4),
    a limit point of the travel of the pin element (4); and
    a maximum point corresponding to the maximum distance of the slide from the extension axis X-X, said maximum point being in a position in-between said start point and said limit point of the travel.

* * * * *